United States Patent [19]
Hirato

[11] 3,922,103
[45] Nov. 25, 1975

[54] PIPE CLASPER

[76] Inventor: Motohide Hirato, 2-13-18, Hase, Kamakura, Kanagawa, Japan

[22] Filed: Oct. 18, 1974

[21] Appl. No.: 515,885

[52] U.S. Cl. ............................. 403/397; 24/81 CR
[51] Int. Cl.² ......................................... F16B 7/00
[58] Field of Search ............ 403/397, 400, 192, 49; 24/81 CR; 52/719; 135/7.1 R

[56] References Cited
UNITED STATES PATENTS

| | | | |
|---|---|---|---|
| 676,397 | 6/1901 | Langlois | 135/7.1 R |
| 1,185,263 | 5/1916 | Symons | 52/719 |
| 1,189,297 | 7/1916 | Schoenthaler | 52/685 |
| 1,213,919 | 1/1917 | Symons | 52/685 |
| 2,102,566 | 12/1937 | Brickman et al. | 52/719 |

*Primary Examiner*—Andrew V. Kundrat
*Attorney, Agent, or Firm*—George B. Oujevolk

[57] ABSTRACT

A pipe clasper is used to couple two pipes in the form of a T, one at the end of the other. The pipes may be used as constructive framework, and the pipe clasper is useful for construction and in particular construction for agricultural use. The pipe clasper according to this invention comprises a cap body mounted on the end of a pipe and a band body for elasticly holding two pipes in a T-shape.

3 Claims, 8 Drawing Figures

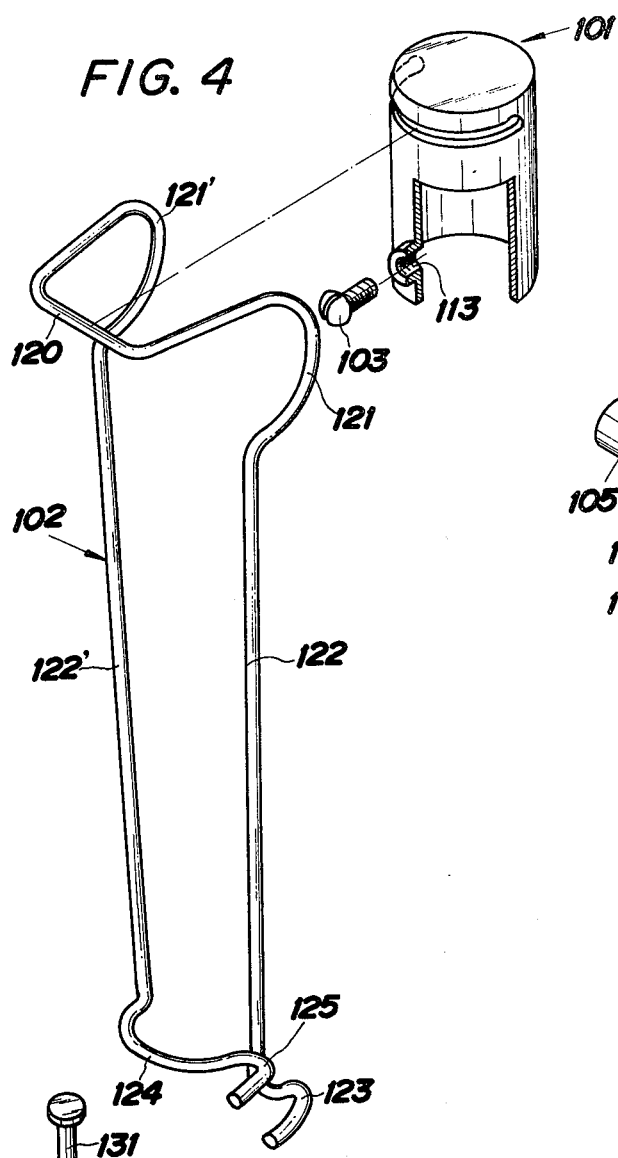
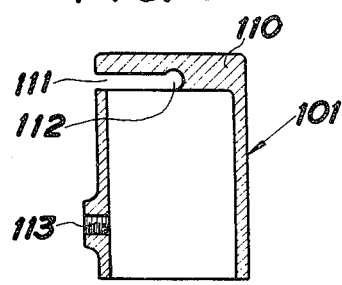
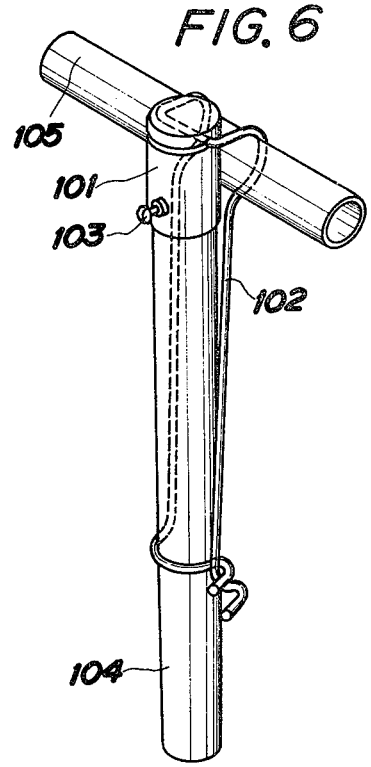
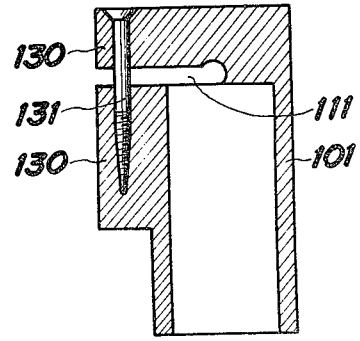
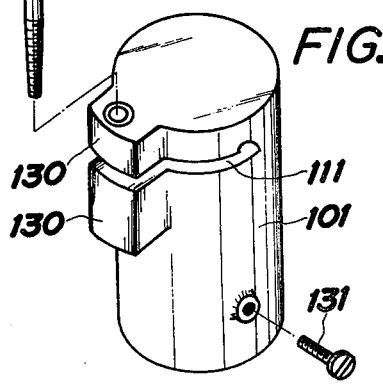

PIPE CLASPER

BACKGROUND OF THE INVENTION

1. Field of the Invention

This invention relates to a pipe clasper for coupling a pipe to the end of another pipe in the form of a T.

2. Description of the Prior Art

As agricultural management has been modernized, vinyl houses have been widely used for cultivating many crops in which use is made of pipe materials as framework and a vinyl cover is attached thereto. In the framework of such vinyl houses, it is necessary to fasten a pipe material to the end of another pipe material constituting, for example, a summit member, in a crossed relationship.

SUMMARY OF THE INVENTION

It is an object of the present invention to provide a pipe clasper most suitable for fastening two pipes.

It is another object of this invention to provide a pipe clasper with which a pipe material is easily but firmly coupled to the end of another pipe in the form of a T, the coupling being easily broken off.

It is a further object of this invention to provide a pipe clasper suitable for use with vinyl houses in that the pipe material is covered at the end thereof with a short tube having a cap and thus inconvenience is avoided in which a vinyl cover attached on the pipe materials would be damaged by the end of the pipe materials.

It is still further object of this invention to provide a pipe clasper which could be manufactured innexpensively by forming the cap body of synthetic resin material and in which assembling and disassembling of the band and the cap bodies are easy, but coupling condition therebetween is stable.

BRIEF DESCRIPTION OF THE DRAWINGS

The above and other objects and advantages will be clearly understood by the following description taken by reference to accompanying drawings in which:

FIG. 4 is a perspective view of a cap body and a band body of a pipe clasper according to a modified embodiment of this embodiment in a separated manner, FIG. 5 is a central longitudinal sectional view of the cap body of the modified pipe clasper, FIG. 6 is a perspective view showing two pipes coupled to each other by the modified pipe clasper, FIG. 7 is a perspective view of another modified embodiment of the cap and FIG. 8 is a longitudinal sectional view of the modified embodiment.

DESCRIPTION OF THE PREFERRED EMBODIMENTS

Figure 1:
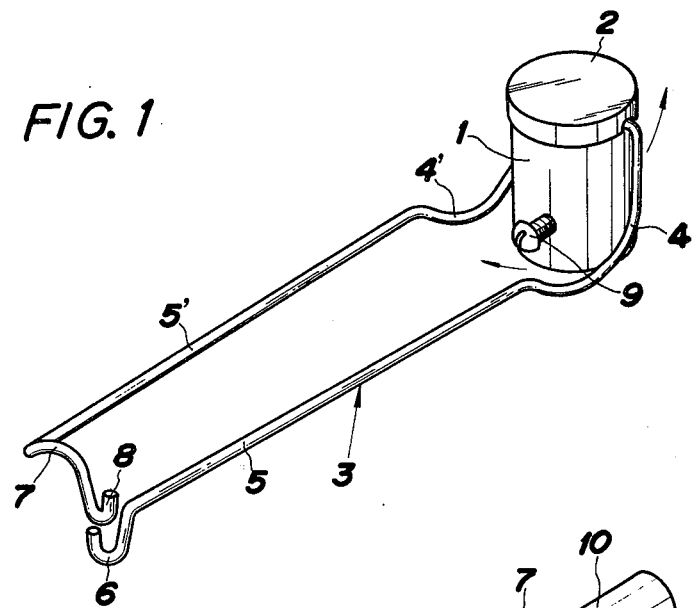
FIG. 1 is a perspective view of the pipe clasper according to this invention.
Figure 2:
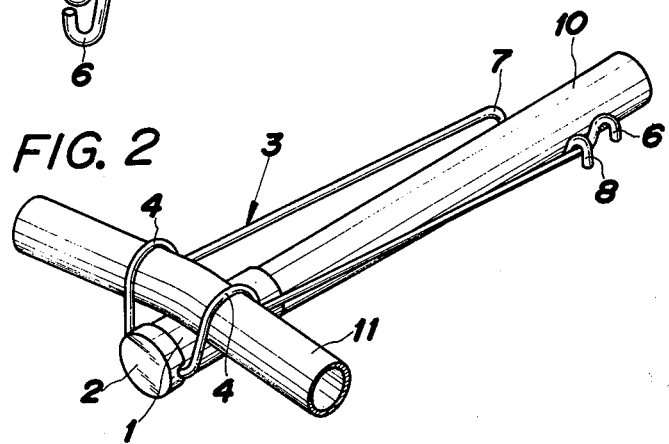
FIG. 2 is a perspective view showing two pipes coupled to each other by means of the pipe clapser.

FIG. 1 is a perspective view of the pipe clasper according to the present invention and the pipe clasper comprises a short tubular cap body 1 with its one end closed by a cover 2 and a band member 3 rotatably mounted on the cap body 1. The band member 3 is made of a bent steel wire and has a central horizontal portion rotatably passing through the cap body 1 in the vicinity of the cover 2. From the central horizontal portion is horizontally extending a pair of semicircular bent portions 4, 4' which continue to a pair of horizontally extending straight portion 5, 5' which are substantially parallel to each other. The end of one of the pair of straight portions 5, 5' is so bent in the forward direction as to provide a hook portion 6. The end of the other stright portion 5' is so bent at right angle to the forward direction toward in the opposite direction to the bent portions 4, 4' in a semi-circular shape so as to provide a stop portion 7 whose end is in turn bent to provide an engaging portion 8. 9 is a fixing screw screwed in the cap body 1.

The cap body 1 has an inner diameter so sized as to allow a steel pipe consisting, for example, of a summit member of a vinyl house, to insert therein. The semicircular bent portions 4, 4' of the band member 3 have a curvature equal to the outer curvature of another steel pipe 11 to be fastened perpendiculary to the steel pipe 10. The band member 3 is made of a single steel wire and has only such elasticity as is effective to rigidly couple the steel wires 10 and 11 to each other.

Figure 3:
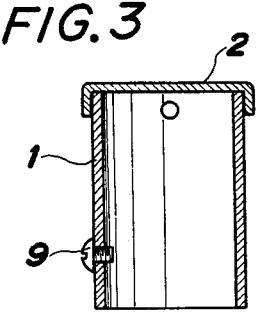
FIG. 3 is a longitudinal sectional view of a cap body.

Explanation will now be given to the coupling of steel pipes by means of the pipe clasper according to the present invention by reference to FIG. 3. In the first place, the end of the steel pipe 10 constituing a summit member is inserted into the cap body 1 and the cap body 1 is firmly fastened to the steel pipe 10 by turning the screw 9. Then another steel pipe 11 is put on the cap body 1 so as to be at right angle with respect to the steel pipe 10 and the band portion 3 is turned to hold the steel pipe 11 on the steel pipe 10 by the bent portions 4, 4'. After that, the stop portion 7 is engaged at the lower surface of the steel pipe 10 and the engaging portion 8 is engaged with the front portion of the hook portion 6.

In this way, the two steel pipes 10 and 11 are firmly coupled at right angle to each other by the elasticity of the band member 3 to provide a stable coupling condition.

FIGS. 4 through 6 show other modified embodiments of the present invention which will be described below with reference to the drawings.

The pipe clasper according to the modified embodiment comprises a cap body 101 with its one end closed and a band member 102 rotatably mounted on the cap body 101. The cap body 101 is formed of synthetic resin such as for example nylon, and has a thick closure portion 110 at its one end and a slot cut from the lateral surface to the center of the closure portion 110. The slot which is little narrower than the diameter of the band member 102 and has at both its extreme ends rotation center hole 112 of substantially the same diameter. The cap body 101 is provided with a bolt hole 113 at its lower portion.

The band member 102 is formed of a single wire bent as desired and has a central horizontal portion 120 rotatably passed through the rotation center hole 112. A pair of semi-circular bent portions 121 and 121' extend in parallel from either extreme ends of the central horizontal portion 120 and a pair of horizontally extending straight portions 122 and 122' continue from the bent portions 121 and 121'. One of the pair of straight portions 122 is bent in its forward direction to provide a hooking portion 123 and the other straight portion 122' is bent at right angle with respect to its forward direction in a semi-circular shape in the opposite direction to the bent portion 121 towards the hooking portion 123 to provide a stop portion 124, the end of which is bent to provide a hooking portion 125. 103 is a screw to be screwed into the bolt hole 113 of the cap body 101. The cap body 101 has an inner diameter sufficient to allow the steel pipe constituting a summit member of, for example, a vinyl house. The bent portions 121 and 121' of the band portion 102 have a curvature substantially equal to the curvature of an outer diameter of the steel pipe 105 coupled to the end of the steel pipe 104 in the form of a T. The band member 102 is made of a single steel wire as above-mentioned and has no less elasticity as a whole. The steel pipes 104 and 105 are firmly coupled to each other by the elasticity of the band member 102. The band member 102 is united with the cap body 101 by putting the central horizontal portion 120 there in through the slot 111 to the rotation center holes 112. Since the slot 111 has a little smaller diameter than the band member 102, the slot 111 is a little reamed when the horizontal portion 120 is put into the slot and thereafter the slot 111 returns to its original condition by the elasticity of the plastic. This action results in preventing the band portion 102 from going out of the slot 111.

Next, explanation will be given to the way of coupling by use of the modified pipe clasper with reference to FIG. 6. At first, the cap body 101 is put into the end of the steel pipe 104 constituting a summmit member and secured thereto by the screw 103. Another steel pipe 105 is put on the cap body 101 in the direction perpendicular to the steel pipe 104 and the band member 102 is turned so that the steel pipe 105 may be held by the bent portions 121, 121' thereof. Then the stop portion 124 is engaged at the lower surface of the steel pipe 104 and the extreme engaging portion 125 of the stop portion 124 is brought in engagement with the front portion of the hook portion 123 to stop the stop portion 124.

In this way, these two pipes 104 and 105 are rigidly coupled at right angle to each other by the elasticity of the band member 102, thereby providing a stable condition of coupling therebetween.

As mentioned above, the pipe clasper according to the present invention permits one steel pipe to be easily coupled to the end of another steel pipe in the form of T and the resulting coupling is very firm and stable, and could easily be taken off if desired.

FIGS. 7 and 8 illustrate further modification of the present invention in which the cap body 101 as shown in FIGS. 4 through 6 is provided with a projection 130 at the front portion of the slot 111 and a clamping bolt 131 is screwed into the projection 130 from above lest the slot 111 should be widened by the band member 102 and the cap body 101 should be damaged at the time of coupling. Namely, after the band member 102 is put into the slot 111, the clamping bolt 131 is screwed into the projection 130 so as to prevent widening of the slot 111. The cap body 101 is prevented from being damaged from the slot 111 by the repulsive force of the band member 102 produced when the steel pipes A and B are coupled to each other by the band member 102.

What is claimed is:

1. A pipe clasper comprising a cap body adapted to fit over the end of a first pipe to be clasped with one end closed, a wire receiving aperture towards said closed end, and a band body made of a single resilient linear wire material bent so as to define a central portion pivotally inserted in said cap body receiving aperture, a pair of bent portions adapted to fit around a second pipe to be clasped, said bent portions extending from both sides of said central portion, and a pair of straight portions extending from the bent portions, the end of one of said pair of straight portions being bent to provide a hook portion and the end of the other straight portions being bent to provide a stop portion and an engaging portion.

2. A pipe clasper comprising a cap body adapted to fit over the end of a first pipe to be clasped made of synthetic resin having a peripheral wall and one end closed, a wire receiving aperture towards said closed end and a band body to be pivotally inserted into said cap body receiving aperture said aperture being provided with a slot from said wall to the center of the cap body and with a pivot center aperture defined in said slot, said slot being a little narrower width than the diameter of said band body and said pivot center aperture being of a size substantially the same as the diameter of said band body and said band body consisting of a central portion, said central portion to be inserted into said pivot center aperture, a pair of bent portions extending from both sides of said central portion and a pair of straight portions extending from said bent portions, the end of one of said pair of the straight portions being bent to provide a hook portion and the end of the other straight portion being bent to provide a stop portion and an engaging portion.

3. A pipe clasper as set forth in claim 2 wherein said cap body is provided with a threaded projection above and below the slot thereof whereby a clamping bolt may be screwed into said projection from above so as to prevent said slot from being widened.

* * * * *